(12) United States Patent
Coupin

(10) Patent No.: US 10,273,356 B2
(45) Date of Patent: Apr. 30, 2019

(54) POLYMER COMPOSITION

(71) Applicant: TOTAL RESEARCH & TECHNOLOGY FELUY, Seneffe (BE)

(72) Inventor: Thierry Coupin, Carnieres (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 160 days.

(21) Appl. No.: 14/899,485

(22) PCT Filed: Jun. 13, 2014

(86) PCT No.: PCT/EP2014/062411
§ 371 (c)(1),
(2) Date: Dec. 17, 2015

(87) PCT Pub. No.: WO2014/202481
PCT Pub. Date: Dec. 24, 2014

(65) Prior Publication Data
US 2016/0152824 A1 Jun. 2, 2016

(30) Foreign Application Priority Data

Jun. 18, 2013 (EP) ..................................... 13172558

(51) Int. Cl.
| | | |
|---|---|---|
| C08L 67/04 | (2006.01) | |
| C08L 3/02 | (2006.01) | |
| C08L 53/00 | (2006.01) | |
| C08L 67/02 | (2006.01) | |
| B29C 41/00 | (2006.01) | |
| B29C 41/04 | (2006.01) | |
| B29C 45/00 | (2006.01) | |
| B29C 47/00 | (2006.01) | |
| B29C 47/06 | (2006.01) | |
| C08L 47/00 | (2006.01) | |
| B29K 9/00 | (2006.01) | |
| B29K 67/00 | (2006.01) | |
| B29L 7/00 | (2006.01) | |
| B29L 9/00 | (2006.01) | |
| B29L 23/00 | (2006.01) | |

(52) U.S. Cl.
CPC ............ *C08L 67/04* (2013.01); *B29C 41/003* (2013.01); *B29C 41/04* (2013.01); *B29C 45/0001* (2013.01); *B29C 47/0004* (2013.01); *B29C 47/0014* (2013.01); *B29C 47/0021* (2013.01); *B29C 47/0023* (2013.01); *B29C 47/06* (2013.01); *C08L 3/02* (2013.01); *C08L 47/00* (2013.01); *C08L 53/00* (2013.01); *C08L 67/02* (2013.01); *B29K 2009/00* (2013.01); *B29K 2067/046* (2013.01); *B29L 2007/002* (2013.01); *B29L 2007/008* (2013.01); *B29L 2009/00* (2013.01); *B29L 2023/22* (2013.01); *C08L 2205/03* (2013.01); *C08L 2205/06* (2013.01)

(58) Field of Classification Search
CPC .. C08L 67/04; C08L 3/02; C08L 53/00; C08L 2205/03
See application file for complete search history.

(56) References Cited

U.S. PATENT DOCUMENTS

| | | | |
|---|---|---|---|
| 5,053,485 A | 10/1991 | Nieuwenhuis et al. | |
| 5,053,522 A | 10/1991 | Muller | |
| 5,117,008 A | 5/1992 | Bhatia et al. | |
| 2009/0234035 A1 | 9/2009 | Cheung et al. | |
| 2009/0299011 A1 | 12/2009 | Wang et al. | |
| 2010/0160505 A1* | 6/2010 | Kumazawa | C08L 67/04 524/112 |
| 2010/0168284 A1 | 7/2010 | Gaggar et al. | |
| 2010/0240832 A1 | 9/2010 | Duc et al. | |
| 2012/0189860 A1* | 7/2012 | Li | C08G 63/912 428/500 |

FOREIGN PATENT DOCUMENTS

| | | |
|---|---|---|
| EP | 0569153 A2 | 11/1993 |
| FR | 2843390 A1 | 2/2004 |
| WO | 1998002480 A1 | 1/1998 |
| WO | 2008037772 A1 | 4/2008 |
| WO | 2008130225 A2 | 10/2008 |
| WO | 2010081887 A1 | 7/2010 |
| WO | 2010097463 A1 | 9/2010 |

(Continued)

OTHER PUBLICATIONS

Tester et al. "Starch-composition, fine structure, and architecture." Journal of Cereal Science, 39, (2004) pp. 151-165 (Year: 2004).*

(Continued)

*Primary Examiner* — Kara B Boyle
(74) *Attorney, Agent, or Firm* — Albert Shung

(57) ABSTRACT

A composition may contain a first polymer, a second polymer, and a block copolymer. The first polymer may be polylactic acid, starch, polybutylene succinate, poly(butylene adipate-co-terephthalate), or a mixture thereof. The second polymer may be polybutadiene, high impact polystyrene, or a mixture thereof. The block copolymer may be a block copolymer of polylactic acid and polybutadiene. The composition may be prepared by a process that includes contacting the first polymer with the second polymer and the block copolymer. Articles may be prepared from the composition.

21 Claims, 5 Drawing Sheets

(56) References Cited

FOREIGN PATENT DOCUMENTS

WO    2011144625  A1    11/2011
WO    2012160042  A1    11/2012

OTHER PUBLICATIONS

International Search Report issued in PCT/EP2014/062411, dated Aug. 19, 2014, 4 pages.
Na-Youn Kim, et al., "Enhanced impact properties of polylactide by poly(lactide-b-butadiene-b-lactide) triblock copolymer"; Macromolecular Research; vol. 19, No. 9, Aug. 12, 2011, pp. 943-947.

* cited by examiner

POLYMER COMPOSITION

CROSS-REFERENCE TO RELATED APPLICATIONS

This application is a National Stage Entry of PCT/EP2014/062411, filed on Jun. 13, 2014; which claims priority to EP 13172558.2, filed on Jun. 18, 2013; the entireties of which are incorporated herein by reference.

FIELD OF THE INVENTION

The invention pertains to a composition comprising a biopolymer such as polylactic acid (PLA), and at least one second polymer.

BACKGROUND OF THE INVENTION

Polylactic acid (PLA) is a synthetic aliphatic polyester derived from renewal resources, such a corn, sugar beet and cassava, which can ultimately be degraded under composting conditions.

Although attempts have been made to utilize PLA for various end-use applications, PLA is known to be brittle and exhibit low toughness, which can result in low impact strength products or articles. Impact resistance of PLA can be modified by using existing polymeric impact modifiers; however, currently available polymeric impact modifiers always decrease transparency of PLA material. For example a liquid plasticizer can be used at high content (>15%) to improve impact resistance of PLA, however during the life time of the PLA blend, there is migration of the plasticizer. Furthermore, it is no possible to use liquid plasticizer in crystalline PLA without avoiding re-crystallization that boosts plasticizer migration.

Impact modifiers such as rubber, poly(ethylene glycol) (PEG), acrylonitrile-butadiene-styrene copolymer (ABS) have been tested. Nevertheless, the immiscibility between these impact modifying additives and the PLA matrix is a major drawback.

Commercially available BioStrength® 150 a methyl methacrylate-butadiene-styrene co-polymer (MBS) is one of the best currently available impact modifiers for PLA; however haze of the resulting PLA material increases from 5, for pure PLA to 95 when 15% w/w of BioStrength® 150 is added. Another commercial product. BioStrength® 280, an acrylic core shell impact modifier, is a less efficient impact modifier, although the resulting PLA material is said to remain transparent. Nevertheless, the present inventors observed that addition 0115% w/w of BioStrength®280, produces a material with a haze of 44.

Plasticizers are additives that increase the fluidity of a material. Commonly used plasticizers, are tributyl citrate (TBC) and acetyl tributyl citrate (ATBC). However, when 15% TBC or ATBC were mixed with PLA, the present inventors observed a plasticizer migration after storage for a few days at room temperature in summer time (25-30° C.).

In turn, Grinsted plasticizer is said not to migrate, however the present inventors observed whitening of PLA-containing Grinsted plasticizer during storage. Additionally differential scanning calorimetry (DSC) showed beginning of crystallization on aged material, Therefore, it can be said that this material is not stable during longer period of time.

Other commonly used polymer modifiers are styrene block copolymers, such as poly(styrene-butadiene-styrene), or SBS, Further studies performed by the present inventors, showed that a blend of PLA with SBS exhibited a total incompatibility even at a concentration as low as 10% w/w of SBS.

There is therefore a need to improve the compositions of the prior art.

SUMMARY OF THE INVENTION

A first aspect of the present invention provides a composition comprising:
- at least one first polymer, selected from the group comprising polylactic acid (PLA), starch, polybutylene succinate (PBS), poly(butylene adipate-co-terephthalate) (PBAT) and mixtures thereof;
- at least one second polymer selected from polybutadiene (PB), high impact polystyrene (HIPS), or mixtures thereof; and
- at least one block copolymer of polylactic acid (PLA) and polybutadiene (PB).

The present inventors have surprisingly found that a block copolymer of PLA and PB was a good compatibilizer for a composition comprising a biopolymer such as polylactic acid (PLA), and another polymer such as polybutadiene. In addition, the present inventors have shown that compositions according to the present invention have improved impact resistance.

A second aspect of the present invention encompasses a process for preparing a composition according to the first aspect of the invention, said process comprising the steps of contacting at least one first polymer, selected from the group comprising polylactic acid (PLA), starch, polybutylene succinate (PBS), poly(butylene adipate-co-terephthalate) (PBAT) and mixtures thereof;
with at least one second polymer selected from polybutadiene (PB), high impact polystyrene (HIPS), or mixtures thereof; and
and with at least one block copolymer of PLA and PB.

A third aspect of the invention encompasses an article comprising a composition according to the first aspect of the invention, or formed using a process according to the second aspect of the invention.

Preferred embodiments of the invention are disclosed in the detailed description and appended claims. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

Figure 1:
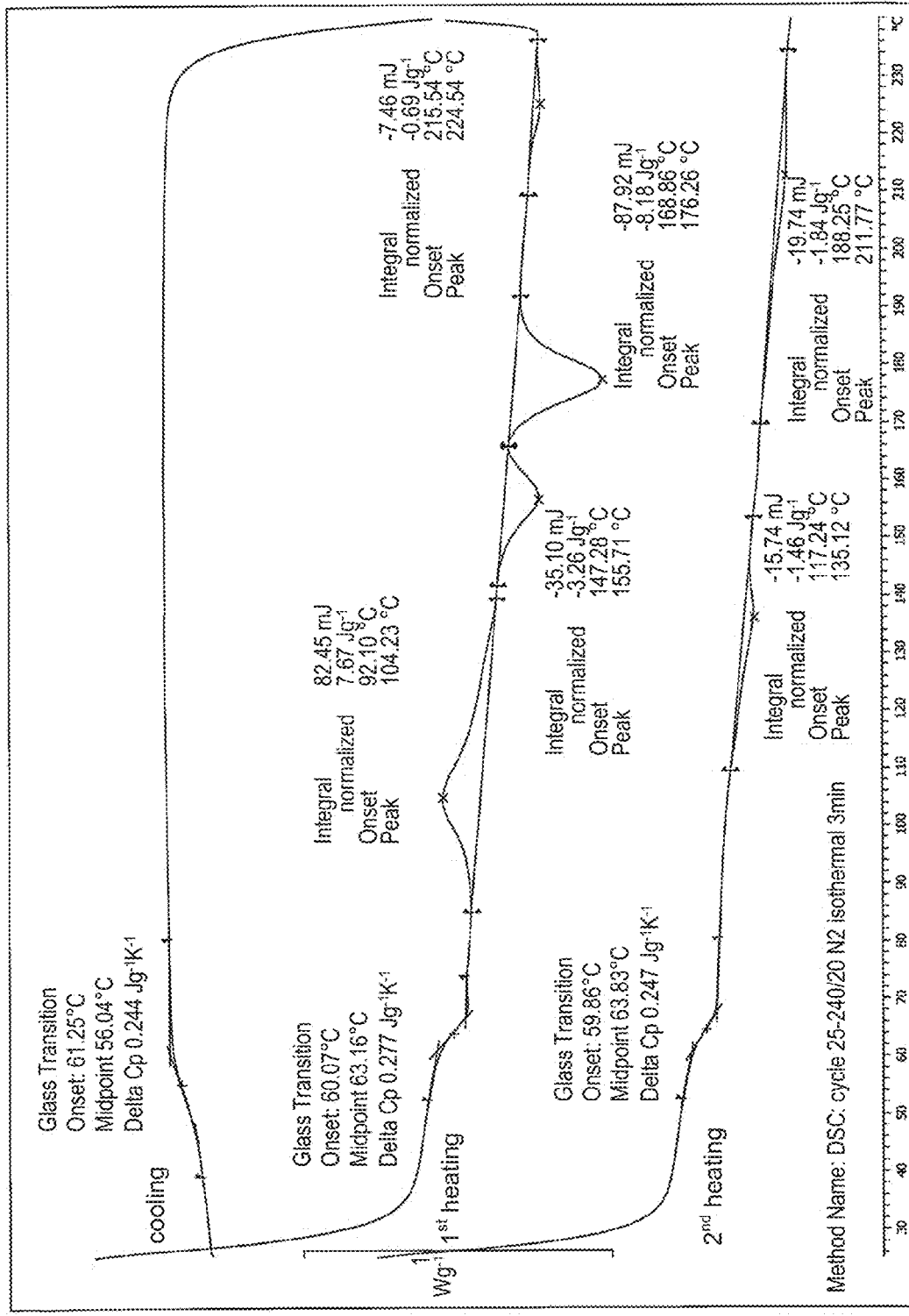
FIG. 1 represents a graph showing the DSC profile of the composition A1, according to an embodiment of the invention.

When describing the invention, the terms used are to be construed in accordance with the following definitions, unless a context dictates otherwise.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail, Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention, Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

As used in the specification and the appended claims, the singular forms "a", "an," and "the" include plural referents unless the context clearly dictates otherwise. By way of example, "a layer" means one layer or more than one layer.

Unless defined otherwise, all technical and scientific terms used herein have the same meaning as is commonly understood by one of skill in the art. All publications referenced herein are incorporated by reference thereto.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

The present invention provides a composition comprising:
at least one first polymer, selected from the group comprising polylactic acid, starch, polybutylene succinate, poly(butylene adipate-co-terephthalate) and mixtures thereof; preferably wherein said at least one first polymer is polylactic acid;
at least one second polymer selected from polybutadiene, high impact polystyrene, or mixtures thereof; preferably wherein said at least one second polymer is polybutadiene and
at least one block copolymer of polylactic acid and polybutadiene, also referred herein as PLA-PB block copolymer.

The present composition comprises at least one first polymer, selected from the group comprising polylactic acid, starch, polybutylene succinate, poly(butylene adipate-co-terephthalate), and mixtures thereof.

The composition may comprise from 5% to 95% by weight, for example from 10% to 90% by weight, for example from 20% to 80% by weight, for example from 30% to 70% by weight of said at least one first polymer based on the total weight of the composition, for example.

In a preferred embodiment, said at least one first polymer is polylactic acid.

As used herein, the terms "polylactic acid" or "polylactide" or "PLA" are used interchangeably and refer to poly (lactic acid) polymers comprising repeat units derived from lactic acid. Examples of suitable grades of polylactic acid include but are not limited to Synterra® PLLA 1010 from Synbra Technology by, NatureWorks® PLA polymer 6201D, NatureWorks PLA polymer 3251, and Futerro® PLA.

Polylactic acid suitable for the composition can be prepared according to any method known in the state of the art. The polylactic acid can be prepared by ring-opening polymerization of raw materials having required structures selected from lactide, which is a cyclic dimer of lactic acid, glycolide, which is a cyclic dimer of glycolic acid, and caprolactone and the like. Lactide includes L-lactide, which is a cyclic dimer of L-lactic acid, D-lactide, which is a cyclic dimer of D-lactic acid, meso-lactide, which is a cyclic dimer of D-lactic acid and L-lactic acid, and DL-lactide, which is a racemate of D-lactide and L-lactide. The PLA used in the present composition can be derived from L-lactic acid, D-lactic acid, or meso-lactide, or a mixture thereof. A mixture of two or more polylactic acid polymers can be used.

Polylactic acid for use in the present composition can be prepared according to any known method such as the process described in documents WO1998/002480. WO 2010/081887, FR2843390, U.S. Pat. No. 5,053,522, U.S. Pat. No. 5,053,485 or U.S. Pat. No. 5,117,008.

In an embodiment, the polylactic acid can be obtained by polymerizing lactide, in the presence of a suitable catalyst, and optionally in the presence of a compound of formula (I), acting as a co-initiator and transfer agent of the polymerization, $$R^1\text{—OH} \qquad (I)$$

wherein $R^1$ is selected from the group consisting of $C_{1-20}$alkyl, $C_{6-30}$aryl, and $C_{6-30}$aryl$C_{1-20}$alkyl optionally substituted by one or more substituents selected from the group consisting of halogen, hydroxyl, and $C_{1-8}$alkyl. Preferably, $R^1$ is selected from $C_{3-12}$alkyl, $C_{5-10}$aryl, and $C_{6-10}$aryl$C_{3-12}$alkyl, optionally substituted by one or more substituents, each independently selected from the group consisting of halogen, hydroxyl, and $C_{1-6}$alkyl; preferably, $R^1$ is selected from $C_{3-12}$alkyl, $C_{6-10}$aryl, and $C_{6-10}$aryl $C_{3-12}$alkyl, optionally substituted by one or more substituents, each independently selected from the group consisting of halogen, hydroxyl and $C_{1-4}$alkyl. The alcohol can be a polyol such as diol, triol or higher functionality polyhydric alcohol. The alcohol may be derived from biomass such as for instance glycerol or propanediol or any other sugar-based alcohol such as for example erythritol. The alcohol can be used alone or in combination with another alcohol. In an embodiment, non-limiting examples of initiators include 1-octanol, isopropanol, propanediol, trimethylolpropane, 2-butanol, 3-buten-2-ol, 1,3-butanediol, 1,4-butanediol, 1,6-hexanediol, 1,7-heptanediol, benzyl alcohol, 4-bromophenol, 1,4-benzenedimethanol, and (4-trifluorornethyl)benzyl alcohol; preferably, said compound of formula (I) is selected from 1-octanol, isopropanol, and 1,4-butanediol.

The polylactic acid structure can be of the following types in terms of chain termination:

R—OH and R—COOH, with R being the polylactic acid chain, obtainable when using monoalcohol as co-initiator, HO—R—OH and HOOC—R—COOH obtainable when using dial as co-initiator, or multiple OH (e.g. 5), obtainable when using triol or higher functionality polyhydric alcohol as co-initiator, The polylactic acid for use in the present composition also includes copolymers of lactic acid. For instance, copolymers of lactic acid and trimethylene carbonate according to EP 11167138 and copolymers of lactic acid and urethanes according to WO 2008/037772 and PCT application number PCT/EP2011/057988.

The polylactic acid for use in the present composition may comprise the product of polymerization reaction of a racemic mixture of L-lactides and D-lactides, also known as poly-DL-lactide. The polylactic acid for use in the present composition may comprise the product of polymerization reaction of mainly D-lactides (or D,D-lactides), also known as poly-D-lactide (PDLA). In an embodiment, the polylactic acid for use in the present composition may comprise the product of polymerization reaction of mainly L-lactides (or L,L-lactides), also known as poly-L-lactide (PLLA). Other suitable polylactic acid can be copolymers of PLLA with some D lactic acid units. PLLA-PDLA stereocomplexes, as described for example in WO 2010/097463, can also be used. The polylactic acid for use in the present composition may comprise the product of polymerization reaction of meso-lactides.

In an embodiment, the PLLA or the PDLA respectively have an optical purity (called isomeric purity) of the L or D isomer, which is higher than 92% of the PLA, preferably higher than 95 w % by weight. An optical purity from at least 98% by weight is more preferred.

Optical purity can be measured by different techniques, such as NMR, polarirnetry or by enzymatic method or GCMS. Preferably, optical purity is measured by enzymatic method and/or NMR, as described for herein below. Enzymatic method: The stereochemical purity of the PLLA or of the PDLA can be determined from the respective content of L-mer or of D-mer. The terms "content of D-mer" and "content of L-mer" refer respectively to the monomer units of type D and of type L that occur in polylactide, using the enzymatic method. The principle of the method is as follows: The L-lactate and D-lactate ions are oxidized to pyruvate respectively by the enzymes L-lactate dehydrogenase and D-lactate dehydrogenase using nicotinamide-adenine dinucleotide (NAD) as coenzyme. To force the reaction in the direction of formation of pyruvate, it is necessary to trap this compound by reaction with hydrazine. The increase in optical density at 340 nm is proportional to the amount of L-lactate or of D-lactate present in the sample. The samples of PLA can be prepared by mixing 25 ml of sodium hydroxide (1 mol/L) with 0.6 g of PLA. The solution was boiled for 8 h and then cooled. The solution was then adjusted to neutral pH by adding hydrochloric acid (1 mol/L), then deionized water was added in a sufficient amount to give 200 ml. The samples were then analyzed on a Vital Scientific Selectra Junior analyzer using, for L-mer determination of poly-L-lactide acid, the box titled "L-lactic acid 5260" marketed by the company Scil and for D-mer determination of poly-D-lactide acid, the box titled "L-lactic acid 5240" marketed by the company Scil. During the analysis, a reactive blank and calibration using the calibrant "Scil 5460" are used. The presence of insertion and racemization defects can also be determined by carbon-13 nuclear magnetic resonance (NMR) (Avance, 500 MHz, 10 mm SELX probe). The samples can be prepared from 250 mg of PLA dissolved in 2.5 to 3 ml of $CDCl_3$.

In an embodiment, the PLLA for use in the composition thus comprises a content of D isomer lower than 8% by weight, preferably lower than 5% by weight, more preferably lower or equal to 2% by weight of the PLLA, for examples a content of L isomer lower than 1% by weight of the PLLA, for examples a content of L isomer lower than 0.5% by weight of the PLLA. By analogy, the PDLA comprises a content of L isomer lower than 8% by weight, preferably lower than 5% by weight, more preferably lower or equal to 2% by weight of the PDLA, for examples a content of L isomer lower than 1% by weight of the PDLA, for examples a content of L isomer lower than 0.5% by weight of the PDLA.

Polylactic acid (PLLA or PDLA) preferably has a weight average molecular weight (Mw) ranging between 30,000 and 500,000 g/mol, more preferably between 50,000 and 400,000 g/mol, even more preferably between 70,000 and 300,000 g/mol. The weight average molecular weight can be measured by chromatography by gel permeation compared to a standard polystyrene in chloroform at 30° C. Measurement of the molecular masses may be performed using a liquid chromatograph WATERS 610. Firstly, a polymer solution is prepared in chloroform (1 mg polymer/ml), Then, 100 µl of this solution is taken and injected, through a filter (with pores of 0.2 µm diameter, on the chromatograph column at 25° C. Molecular masses are determined from the retention time in the column, translated in mass equivalent using a universal calibration law based on polystyrene standards. For example, ASTM practice D3016-97(2010) may be used. In an embodiment, the ratio of the weight average molecular weight (Mw) to the number average molecular weight (Mn) is generally from 1.0 to 5.0.

In an embodiment, the polylactic acid may have a density of from 1.228 $g/cm^3$ to 1.269 $g/cm^3$, for example from 1,230 $g/cm^3$ to 1,260 $g/cm^3$, for example from 1.235 $g/cm^3$ to 1.255 $g/cm^3$ (as determined in accordance with ASTM D792).

In an embodiment, the polylactic acid may exhibit a crystalline melt temperature (Tc) of from 140° C. to 190° C., for example from 145° C. to 185° C., for example from 160° C. to 180° C. (as determined in accordance with ASTM D3418).

In an embodiment, the polylactic acid may exhibit a glass transition temperature (Tg) of from 45° C. to 85° C., for example from 50° C. to 80° C., for example from 50° C. to 70° C. (as determined in accordance with ASTM D3417).

In an embodiment, the polylactic acid may exhibit a tensile yield strength of from 4000 psi to 25000 psi, for example from 5000 psi to 10000 psi, for example from 5500 psi to 8500 psi (as determined in accordance with ASTM D638).

In an embodiment, the polylactic acid may exhibit a tensile elongation of from 0.5% to 10%, for example from 1.0% to 8%, for example from 1.50% to 6% (as determined in accordance with ASTM D638).

In an embodiment, the polylactic acid may exhibit a tensile modulus strength of from 3100 MPa to 4000 MPa (as determined in accordance with ISO-527).

composition may include from 5% to 95% by weight, for example from 10% to 90% by weight, for example from 20% to 80% by weight, for example from 30% to 70% by weight of polylactic acid based on the total weight of the composition.

In an embodiment, the at least one first polymer is starch. The starch that can be utilized in the composition includes, for example, potato starch. COM starch, wheat starch, rice starch, amaranth, tapioca starch, and the like. The term starch generally applies to a white, granular or powdery, odourless, tasteless, complex carbohydrate, preferably with formula $(C_6H_{10}O_5)x$, which can be abundant in the seeds of cereal plants and in bulbs and tubers. In an embodiment, starch refers to a polymer of glucose found as a reserve in most plants. Starch preferably comprises α-glucosidic bonds, which can cause helix-shaped molecules. Preferably, starch comprises molecules having at least two kinds of structures: (i) amylase (structure 1), wherein the $C_6H_{10}O_5$ groups can be (linked mainly α(1-4) bonds) arranged in a continuous but curled chain somewhat like a coil of rope; and (ii) amylopectin (structure 2), wherein considerable side-branching of the molecule can Occurs.

Starch ethers are modified starch comprising ether groups such as hydroxypropyl-starch, cationic starch and carboxymethyl starch, Starch succinates comprise anionic starch esterified by succinate groups. Starch xanthates are starch esterified by xanthate groups. Starch derivatives, such as through hydrolysis to yield for example dextrins (for example, maltodextrin), alone or in combination with starches also can be utilized according to the invention.

In an embodiment, the at least one first polymer is polybutylene succinate. As used herein, the terms "PBS" or "polybutylene succinate" are used interchangeably and refer to polybutylene succinate polymers. Suitable polybutylene succinate can be obtained by polycondensation reactions of glycols, such as 1,4-butanediol, with a dicarboxylic acid or an acid anhydride thereof, such as succinic acid, A polybutylene succinate polymer may either be a linear polymer or a long-chain branched polymer. A long-chain branched polybutylene succinate polymer can be prepared by using an additional polyfunctional component selected from the group consisting of trifunctional or tetrafunctional polyols, oxycarboxylic acids, and polybasic carboxylic acids. Polybutylene succinate polymers are known in the art and are described, for example, in EP 0 569 153 to Showa Highpolymer Co., Ltd., Tokyo, Japan. Non-limiting exemplary polymer is a polybutylene succinate homopolymer sold under tradename Bionelle 1000™ available from Showa Highpolyrner Co., Ltd.

In an embodiment, the at least one first polymer is poly(butylene adipate-co-terephthalate). As used herein, the

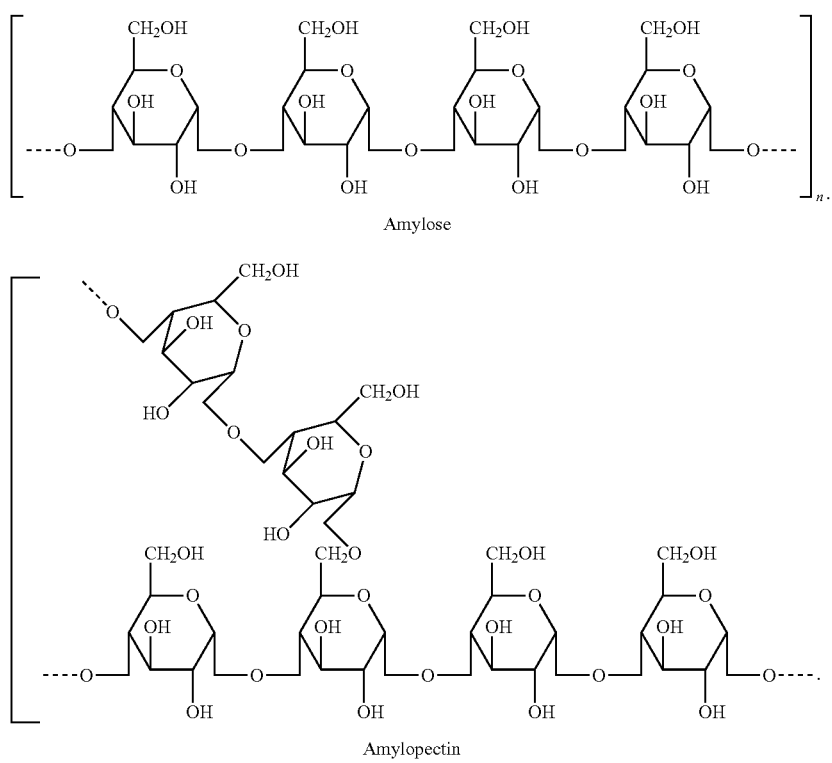

Structure 1
Amylose

Structure 2
Amylopectin

In some embodiments, the term starch also comprises, starch ester, starch ether, starch succinate, and starch xanthate. Starch esters are modified starch comprising ester groups like acetylated starch and starch monophosphate. For example, potato starch is a natural starch phosphate ester, terms "PBAT" or "poly(butylene adipate-co-terephthalate)" are used interchangeably and refer to polymers encompassing random copolymer of butylene adipate and terephthalate. Poly(butylene adipate-co-terephthalate) suitable for the present composition can be prepared according to any method known in the state of the art. For example, poly (butylene adipate-co-terephthalate) can be prepared by polycondensation between 1,4-butanediol and a mixture of adipic acid and terephthalic acids. Non-limiting commercial examples include Ecoflex® (BASF); Oligo-Bi® (Novamont); EnPOL™ G8060 and EnPOL™ 8000 by Ire Chemical Ltd of Seoul.

The present composition also comprises at least one second polymer selected from polybutadiene (PB), high impact polystyrene (HIPS), or mixtures thereof.

The composition may comprise from 5% to 95% by weight, for example from 10% to 90% by weight, for example from 20% to 80% by weight, for example from 30% to 70% by weight of said at least one second polymer based on the total weight of the composition.

In a preferred embodiment, the at least one second polymer is polybutadiene. As used herein, the terms "PB" or "polybutadiene" are used interchangeably. Polybutadiene suitable for the present composition can be prepared according to any method known in the state of the art. Suitable polybutadiene includes polymer formed from the polymerization of 1,3-butadiene. The micro-structure of the polybutadiene can be any of the conventional types containing various amounts of 1,2-vinyl, 1,4-cis and 1,4-trans levels. Non-limiting suitable examples of polybutadiene include polybutadiene of essentially linear structure.

Advantageously the weight average molecular weight (Mw) of the polybutadiene can range from 100,000 to 500,000 and preferably from 280,000 to 360,000 g/mol. Advantageously the polydispersity index of the polybutadiene can range from 2.1 to 2.5 and preferably from 2.1 to 2.3. Polybutadiene molecular-weights can be measured by the conventional size-exclusion chromatography techniques. They are here expressed in PS equivalents, i.e. using isomolecular PS samples as calibration standards.

Particularly suitable polybutadiene can have a solution viscosity (SV), measured at 5.43% weight in toluene or styrene, of 50 to 1000 centipoises, preferably from 100 to 500 centipoises and more preferably from 120 to 250 centipoises (measured according to IC-5a). Particularly suitable polybutadiene can have a Mooney viscosity (ML4+1, 100° C.) of 5 to 120, preferably from 10 to 100 and more preferably from 30 to 60 ME (measured according to ASTM D 1646). Particularly suitable polybutadiene can have a SV-to-Mooney viscosity ratio of at least 2.8, and more preferably above 3.3.

Particularly suitable polybutadiene can have a cis content of at least 90%, for example at least 95%, wherein the cis content is measured by infrared spectroscopy or nuclear magnetic resonance as known to one of ordinary skill in the art.

Examples of polybutadiene suitable for use in this composition include without limitation BUNA CB 728 T or Buna CB 1414, or Buna CB 1415 butadiene elastomers, which are high cis polybutadiene elastomers commercially available from LANXESS Deutschland GmbH.

Suitable polybutadiene include also functionalized polybutadiene. Suitable functionalization include b are not limited to hydroxyl, epoxy, maleic anhydride, silane or tailor made structures.

In an embodiment, the at least one second polymer is high impact polystyrene (HIPS). As used herein, the terms "HIPS" or "high impact polystyrene" are used interchangeably. The process for making HIPS is well known to those skilled in the art. For example, the process may comprise polymerizing styrene monomer in the presence of dissolved rubber. Polymerization of styrene, and optionally a comonomer, may be initiated by heating and/or by an initiator, by way of example a radical initiator. The rubber may be "dissolved" in the styrene monomer. The usual rubber types utilized in the manufacture of HIPS include polybutadiene (PB), styrene-butadiene rubber (SBR), and styrene-butadiene-styrene rubber (SBS), Polystyrene may be initially formed from the styrene monomer within the homogeneous rubber solution in styrene. In HIPS, a part of the styrene may be replaced by unsaturated monomers copolymerizable with styrene such as other monovinylaromatic monomers, alkyl esters of acrylic or methacrylic acid and acrylonitrile. Non-limiting examples of suitable processes for preparing HIPS are described in US20101240832, incorporated herein by reference.

The present composition also comprises at least one block copolymer of PLA and PB. The composition may comprise from 1% to 90% by weight, for example from 4% to about 50% by weight, for example from 10% to 40% by weight, for example from 10% to 30% by weight of said block copolymer based on the total weight of the composition, for example.

Suitable block copolymer comprises polymer comprising multiple sequences, or blocks, of the same monomer alternating in series with different monomer blocks; these blocks are covalently bound to each other. Block copolymers are normally prepared by controlled polymerization of one monomer, followed by chain extension with a different monomer, Block copolymers are classified based on the number of blocks they contain and how the blocks are arranged. For example, block copolymers with two blocks are called diblocks; those with three blocks are triblocks; and those with more than three are generically called multiblocks. Classifications by arrangement include the linear, or end-to-end, arrangement and the star arrangement, in which one polymer is the base for multiple branches.

In an embodiment, said block copolymer is selected from PLA-PB diblock copolymer, PLA-PB-PLA triblock copolymer, PLA-PB multiblock copolymer, PLA-PB star copolymers, PLA-PB comb copolymers. PLA-PB gradient containing block copolymers, and other copolymers having a blocky structure, which will be known by those skilled in the art, Preferable diblock and triblock copolymers include PLA-PB and PLA-PB-PLA block copolymers. An example of a gradient containing block copolymer is when the monomer or monomers used from one segment are allowed to further react as a minor component in the next sequential segment. For example, if the monomer mix used for the 1st block (A block) of an AB diblock copolymer is polymerized to only 80% conversion, then the remaining 20% of the unreacted monomer is allowed to react with the new monomers added for the B block segment the result is an AB diblock copolymer in which the B segment contains a gradient of the A segment composition. The term "comb copolymer," as used herein, describes a type of graft copolymer, wherein the polymeric backbone of the graft copolymer is linear, or essentially linear and is made of one polymer A, and each side chain (graft segment) of the graft copolymer is formed by a polymer B that is grafted to the polymer A backbone. Used herein, the terms "comb copolymer" and "graft copolymer" have the same meaning.

In an embodiment, the block copolymer is produced by combining a lactide and a polybutadiene, preferably a hydroxy functionalized polybutadiene. In one or more embodiments, the block copolymer is produced by melt blending a lactide and a hydroxy functionalized polybutadiene. Such processes may utilize catalysts for polylactic acid formation, such as tin compounds (e.g., tin octylate), titanium compounds (e.g., tetraisopropyl titanate), zirconium compounds (e.g., zirconium isopropoxide), antimony compounds (e.g., antimony trioxide) or combinations thereof, for example.

Among the hydroxyl-terminated polybutadienes that are useful for preparing the block copolymers are those possessing a number average molecular weight (Mn) of at least 1000 g/mol, for example at least 5000 g/mol, preferably at least 10000 g/mol, for example at least 20000 g/mol, for example at least 30000 g/mol, for example from 1000 to 40000 g/mol, for example from 1000 to 35000 g/mol, for example from 1000 to 25000 g/mol, for example from 1000 to 20000 g/mol, for example From 1000 to 15000 g/mol, and advantageously from 1000 to 10000 g/mol.

Among the hydroxyl-terminated polybutadienes that are useful for preparing the block copolymers are those possessing a hydroxyl group content of from 0.10 to 3.0 Mmol/g.

Hydroxyl-terminated polybutadienes of the above-described type, averaging more than one predominantly primary hydroxyl group per molecule, e.g., averaging from 1.5 to 3 or more primary hydroxyl groups per molecule, can be suitably employed herein. Branched hydroxyl-terminated polybutadienes can possess an average of at least 1.90, and advantageously from 1.95 up to 2.8, hydroxyl groups per molecule, the hydroxyl groups being predominantly in terminal positions on the main, i.e., the terminal hydroxyl groups of the polymer, are bonded to carbon atoms adjacent to double bonded carbon atoms.

The hydroxyl-terminated polybutadiene may have a vinyl content of at least 15%, Herein a vinyl content of at least 10% refers to hydroxyl-terminated polybutadiene wherein at least 15% of the material has terminal double bonds.

The useful hydroxyl-terminated polybutadienes herein can also incorporate one or more other copolymerizable monomers that can confer particularly desirable properties upon the copolymers herein and the compositions prepared therewith. Included among the copolymerizable monomers are mono-olefins and dienes such as ethylene, propylene, 1-butene, isoprene, chloroprene, 2,3-methyl-1,3-butadiene, 1,4-pentadiene, etc., and, ethylenically unsaturated monomers such as acrylonitrile, methacrylonitrile, methylstyrene, methyl acrylate, methyl methacrylate, vinyl acetate, etc. Alternatively or in addition thereto, the hydroxyl-terminated polybutadienes can be reacted with one or more other monomers to provide hydroxyl-terminated block copolymers. Such monomers include 1,2-epoxides such as ethylene oxide and propylene oxide which will provide polyether segments, e-caprolactone which will provide polyester segments, and the like.

Hydroxyl-terminated polybutadienes possessing these characteristics are commercially available from several sources and are therefore conveniently employed herein.

Examples of suitable hydroxyl-terminated polybutadiene include hut are not limited to Krasol® LBH 10000, Krasol® LBH 2000, Krasol® LBH 3000 and Krasol® LBH 5000, Krasol® LBH-P 2000, Krasol® LBH-P 3000, Krasol® LBH-P 5000, Poly Bd® R45HTLO, Poly Bd® R20LM commercially available from HSC Cray Valley Corp., as well as the epoxidized hydroxyl-terminated polybutadiene such as Poly Bd® 605 and Poly Bd® 600 commercially available from HSC Cray Valley Corp.

In an embodiment, said block copolymer comprises at least 10% by weight of hydroxyl functionalized polybutadiene based on the total weight of the block copolymer. In an embodiment, said block copolymer comprises from 10% to 90% by weight of hydroxyl functionalized polybutadiene based on the total weight of the block copolymer.

The present invention is directed towards use of such block copolymers as additives to compatibilize the first polymer with the second polymer.

In some embodiments, the composition comprises from 30 to 48% by weight of said first polymer, from 30 to 48% by weight of said second polymer, and from 4 to 40% by weight of said block copolymer, based on the total weight of the composition.

In some embodiments, the composition comprises from 30 to 48% by weight of PLA, from 30 to 48% by weight of PB, and from 4 to 40% by weight of block copolymer, based on the total weight of the composition.

The present invention also encompasses a process for preparing a composition comprising the steps of
contacting at least one first polymer, selected from the group comprising polylactic acid, starch, polybutylene succinate, poly(butylene adipate-co-terephthalate) and mixtures thereof;
with at least one second polymer selected from polybutadiene, high impact polystyrene, or mixtures thereof; and
and with at least one block copolymer of polylactic acid and polybutadiene.

Any process known in the art can be applied for preparing a composition as presently described.

In some embodiments, said contacting step comprises melt blending the first polymer, the second polymer and the block copolymer, in a single step. The blending may occur by introducing the block copolymer, the first polymer, and the second polymer, into a system capable of combining and melting the components to initiate chemical and physical interactions between the block copolymer and the first and second polymers components. For example, the blending may be accomplished by introducing the first and second polymers, and the block copolymer into a batch mixer, continuous mixer, single screw extruder or twin screw extruder, for example, to form a homogeneous mixture or solution while providing temperature conditions so as to melt the blend components and initiate chemical and physical interactions between the block copolymer and the first and second polymers components as described above, thereby producing a compatibilized first and second polymers blend.

In another embodiment, contacting of the above-mentioned components may generally occur in a two-step process. In a first step, the first polymer and the block copolymer, may be melt blended. Subsequently, in a second step, the second polymer may be introduced and melt blended with the first polymer blend.

In an embodiment, the composition is prepared by extrusion. In an embodiment, the composition is extruded at a temperature of at least 90° C., for example at least 95° C., for example at least 100° C., for example ranging from 100° C. to 230° C. More preferably, the composition is extruded at a temperature ranging from 100° C. to 200° C.

In an embodiment, any of the previously described compatibilized compositions may further comprise additives to impart desired physical properties, such as printability, increased gloss, or a reduced blocking tendency. Examples of additives may include, without limitation, stabilizers, ultra-violet screening agents, oxidants, anti-oxidants, anti-static agents, ultraviolet light absorbents, fire retardants, processing oils, mold release agents, coloring agents, pigments/dyes, fillers or combinations thereof, for example. These additives may be included in amounts effective to impart desired properties.

In an embodiment, the compositions and blends thereof may be formed into a wide variety of articles such as films, pipes, fibers (e.g., dyeable fibers), rods, containers, bags, packaging materials, and adhesives (e.g., hot melt adhesives) for example, by polymer processing techniques known to one of skill in the ad, such as forming operations including film, sheet, pipe and fiber extrusion and co-extrusion as well as blow molding, injection molding, rotary molding, and thermoforming, for example. Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example, Extruded articles include medical tubing, wire and cable coatings, hot melt adhesives, sheets, such as thermoformed sheets (including profiles and plastic corrugated cardboard), geornembranes and pond liners, for example, Molded articles include single and multilayered constructions in the form of bottles, tanks, large hollow articles, rigid food containers and toys, for example.

In another embodiment, the cornpatibilized blend may be utilized as a compatibilizer to a second polymeric blend comprising a second first polymer and a second polymer to compatibilize the second blend. The present invention can be further illustrated by the following examples, although it will be understood that these examples are included merely for purposes of illustration and are not intended to limit the scope of the invention unless otherwise specifically indicated.

EXAMPLES

Unless otherwise indicated, all parts and all percentages in the following examples, as well as throughout the specification, are parts by weight or percentages by weight respectively.

Example 1 Preparation of Poly(lactide-b-butadiene-b-lactide Triblock Copolymer (Scheme 1)

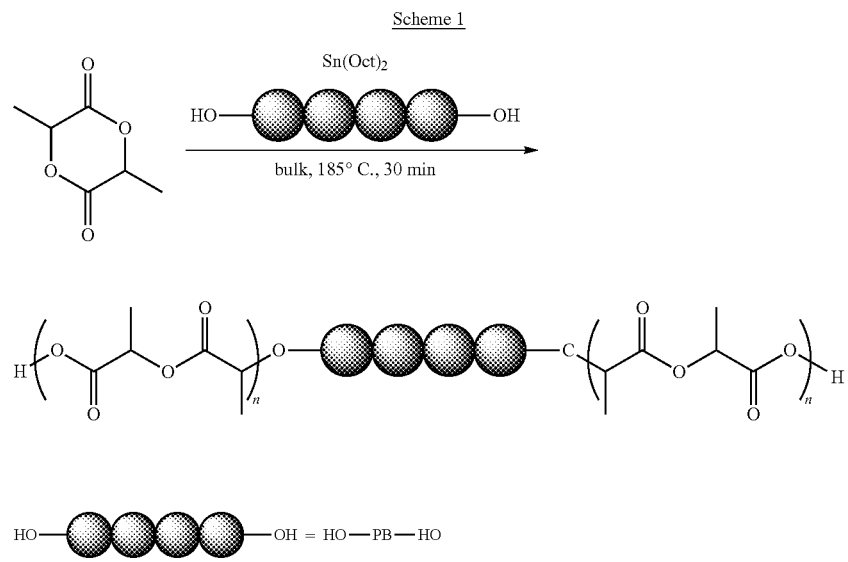

Hydroxy terminated polybutadiene (Krasol®LBH10000 from HSC Cray Valley Corp) was reacted with L-lactide in the presence of a catalyst to prepare the triblock copolymer. Krasol®LBH10000 from HSC Cray Valley Corp, had the following properties: Microstructure: 1,2-(vinyl): about 65 wt %, 1,4-cis: about 18 wt %; 1,4-trans: about 17 wt %; Content of OH groups 0.16-0.22 (Mmol/g), Hydroxyl number 8.9-12.4 Mg KOH/g, Viscosity Brookfield 20-50 Pa·s at 50° C. Density: about 0.9 g/cm$^3$ at 20° C.; Molecular weight (Mn): 9000-11000 g/mol, Polydispersity Index (Mw/Mn): 1.1. Purified L-Lactide from Futerro optical purity above 99.5% was used.

Hydroxy terminated polybutadiene (7.78 g) and L-lactide (8.0 g) were heated to 185° C. under $N_2$ until a clear mixture was obtained. $Sn(Oct)_2$ (112 mg) was added. Polymerization was carried out for 30 min and the product (copolymer 6) was precipitated in ethanol.

The same experiment was repeated with different concentrations of hydroxyl terminated polybutadiene, and the modulus and tensile properties of the copolymers were measured as described in ISO 527-1BA. The results are shown in Tables 1 and 2, and compared with the modulus and tensile properties measure for PLA (PLLA (NatureWorks® PLA polymer 6201D).

TABLE 1

Modulus on PLA-PB-PLA copolymer (tensile –20 mm/min - 100%/min) at 23° C.

| Example | PB quantity % | HO-PB-OH (Mn) g·mol$^{-1}$ | Conversion % | Mn theoretic g·mol$^{-1}$ | Haze % | Modulus Mpa |
|---|---|---|---|---|---|---|
| PLA6201 | 0 | | | | <10 | 3260 |
| Copolymer 1 | 14 | 10.000 | 92 | 72.100 | <10 | 2031 |
| Copolymer 2 | 19 | 10.000 | 91 | 52.600 | <10 | 1637 |
| Copolymer 3 | 23 | 10.000 | 94 | 43.500 | <10 | 848 |
| Copolymer 4 | 26 | 10.000 | 91 | 38.500 | <10 | 787 |
| Copolymer 5 | 32 | 10.000 | 95 | 31.500 | <10 | 249 |
| Copolymer 6 | 52 | 10.000 | 95 | 19.250 | <10 | 20 |

TABLE 2

Elongation at break on PLA-PB-PLA copolymer (tensile 20 mm/min - 100%/min) at 23° C.

| Example | PB quantity % | HO-PB-OH g·mol$^{-1}$ | Conversion % | Mn theoretic g·mol$^{-1}$ | yield Tensile Mpa | yield Stress % | Break Tensile Mpa | Break Stress % |
|---|---|---|---|---|---|---|---|---|
| PLA6201 | 0 | | | | 70.2 | 2.3 | 55.7 | 6.8 |
| Copolymer 1 | 14 | 10.000 | 92 | 72.100 | 52.9 | 2.9 | 17.0 | 7.2 |
| Copolymer 2 | 19 | 10.000 | 91 | 52.600 | 35.0 | 2.5 | 13.0 | 23.0 |
| Copolymer 5 | 32 | 10.000 | 95 | 31.500 | 12.7 | 2.5 | 11.5 | 25.7 |

Example 2

A composition according to an embodiment was prepared by blending 40% by weight of PLLA with 40% by weight of polybutadiene and 20% by weight of copolymer 6 prepared as described in example 1.

The composition was melt blended in counter-rotating twin screw extruder, at 200° C., 100 rpm, 5 bar, and a residence time of 2 min.

The PLLA used was Synterra® PLLA 1010 from Synbra Technology by, with the following characteristics: a melt flow rate of 22 (±5) g/600 s (ISO 1133 (190"C/2.16 kg), a density of 125 g/cm$^3$ (ISO 1183), a D-isomer content lower than 1%, a melting temperature of 175-180° C. (DSC:ISO 11357) and a glass transition temperature of 55-60° C. (DSC:ISO 11357).

The polybutadiene used was high cis polybutadiene BUNA CB 728 T from LANXESS Deutschland GmbH, having a Mooney viscosity of 44 ME (ISO 289/ASTM D 1646), a solution viscosity (5.43% in toluene) of 160 mPa·s (ISO 3105 (543% in toluene), and a cis 1,4 content of 96% by weight.

Example 3

A composition A1 according to an embodiment of the invention was prepared by blending 40% by weight of PLLA (Synterra® PLLA 2010 from Synbra technology b.v) with 40% by weight of PLLA-PB-PLLA block copolymer 6 prepared in example 1, and with 20% by weight of polybutadiene (PB) (BUNA CB 728 T). The physical properties of Synterra® PLLA 2010 are shown in Table 3.

TABLE 3

| PHYSICAL PROPERTIES | TEST METHOD | UNITS | SPECIFICATION |
|---|---|---|---|
| Appearance | | | round pellets |
| Color | | | Off white (crystallized) |
| Melt Flow Rate | ISO 1133 (190° C./2.16 kg) | g/600 s | 4 (+−2) |
| Polymer Density | ISO 1183 | g/cm$^3$ | 1.25 |
| Moisture content | | | <400 ppm |
| Residual Monomer | | % | <0.5 |
| D-Isomer | | % | <1 |
| Melting temperature | DSC:ISO 11357 | ° C. | 175-180 |
| Glass Transition temperature | DSC:ISO 11357 | ° C. | 55-60 |

PLLA pellets were dried in a vacuum oven for 1 h at 110° C.

The composition A1 was melt blended in a (Haake) counter-rotating twin screw mini-extruder, at 5 bars, 200° C., 100 rpm and a residence time of 3 min for 5 passes.

A comparative composition A2 was prepared by blending 80% by weight of PLLA (Synterra® PLLA 2010 from Synbra technology b.v) with 20% by weight of polybutadiene (BUNA CB 728 T).

The composition A2 was melt blended in a (Haake) counter-rotating twin screw mini-extruder, at 200° C., 100 rpm and a residence time of 5 min.

Figure 2:
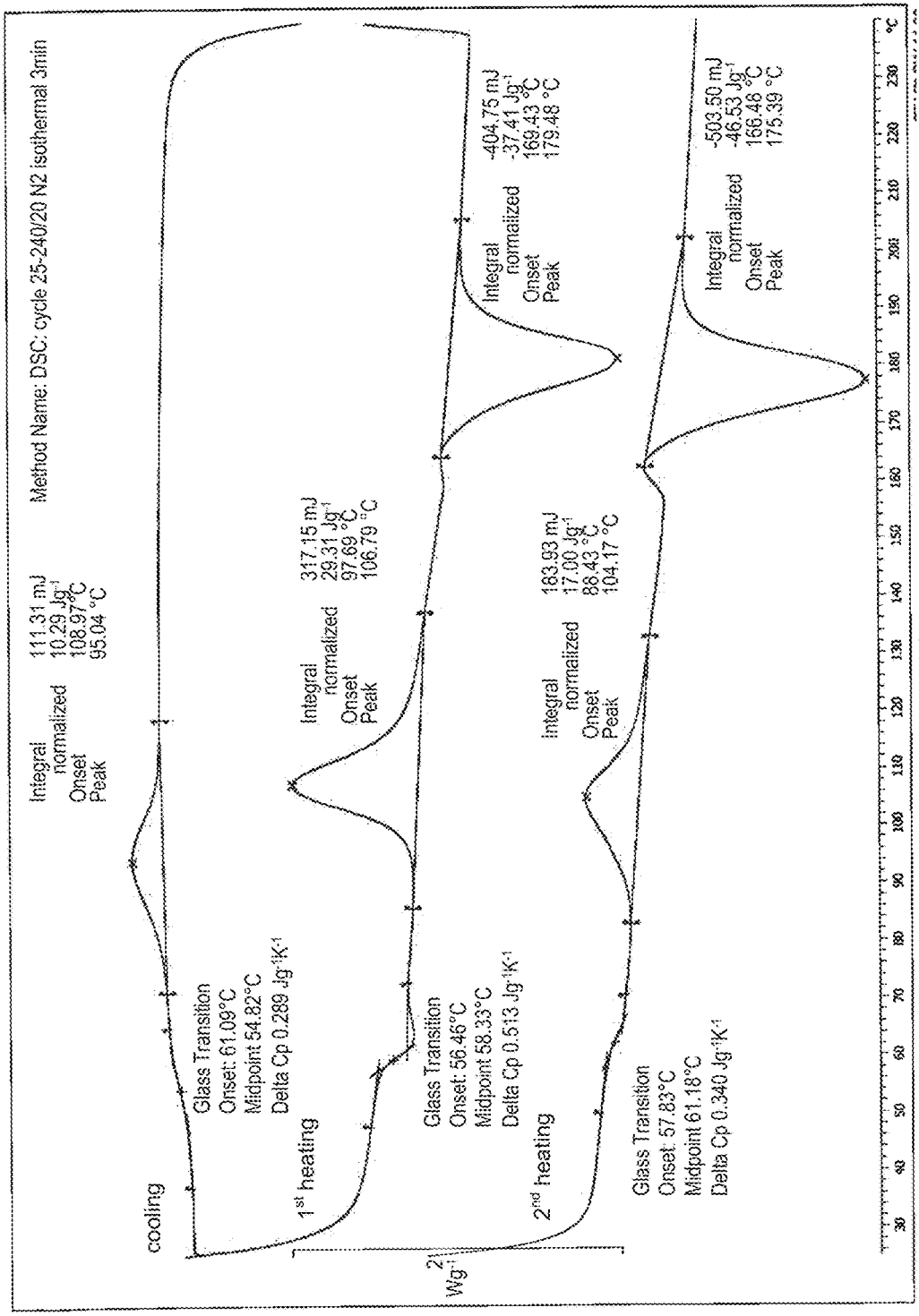
FIG. 2 represents a graph showing the DSC profile of the composition A2.

Thermal properties of the composition were analyzed with Perkin-Elmer Pyris Diamond differential scanning calorimeter (DSC) calibrated with indium as standard. The specimens were heated from 25 to 240° C. at a rate of 20° C./min, under N$_2$, followed by an isothermal at 240° C. for 3 min, and a subsequent cooling scan to 25"C at rate of 20° C./min. And then were reheated to 240° C. at 20° C./min. Glass transition temperature (Tg), melting temperature (Tm) and the enthalpy of melting (ΔHm) were measured. The DSC thermogram of composition A1 is presented in FIG. 1. The DSC thermogram of composition A2 is presented in FIG. 2.

A comparative composition A3 was prepared by blending 60% by weight of PLLA (Synterra® PLLA 2010 from Synbra technology b.v) with 40% by weight of polybutadiene (BUNA CB 728 T).

The composition was melt blended in Brabender co-rotating twin screw extruder, at 200° C., 100 rpm, 5 bar, and a residence time of 2 min.

Mechanical properties of the compositions were investigated by Izod impact tester. Un-notched Izod impact was measured at 23° C. according to IS0180. Unnotched test specimen 9.99 mm×4.21 mm (section 42.1 mm$^2$) is held as a vertical cantilevered beam and is impacted at 3.5 m/s by a swinging pendulum (5.5 J).

The results are shown in Table 4.

TABLE 4

| Compositions | Un-notched Izod (kJ/m$^2$) |
| --- | --- |
| Composition A1 | 51.4 ± 0.2 |
| Composition A2 | 21.4 ± 6.2 |
| Composition A3 | 3.1 ± 2.5 |

An exceptional impact has been obtained in the composition A1 with an Un-notched Izod measured at 51.4 kJ/m$^2$.

The compositions were further analyzed by Scanning backscattered Electron Microscopy. The sample preparation was as follows: A test piece was prepared with the composition; a 0.1 to 1 mm$^2$ surface was milled in the test piece with a diamond bur. The surface was then out using a microtome (0.35 microns/slice) using a diamond knife. The microtome cutting was performed at room temperature. The sample was then exposed to osmium tetraoxide (99.8% OsO4; Aldrich) for 48 hours. The sample was allowed to rest for 48 hours. The scanning surface was cut again with a microtome at room temperature using a diamond knife.

Figure 3:
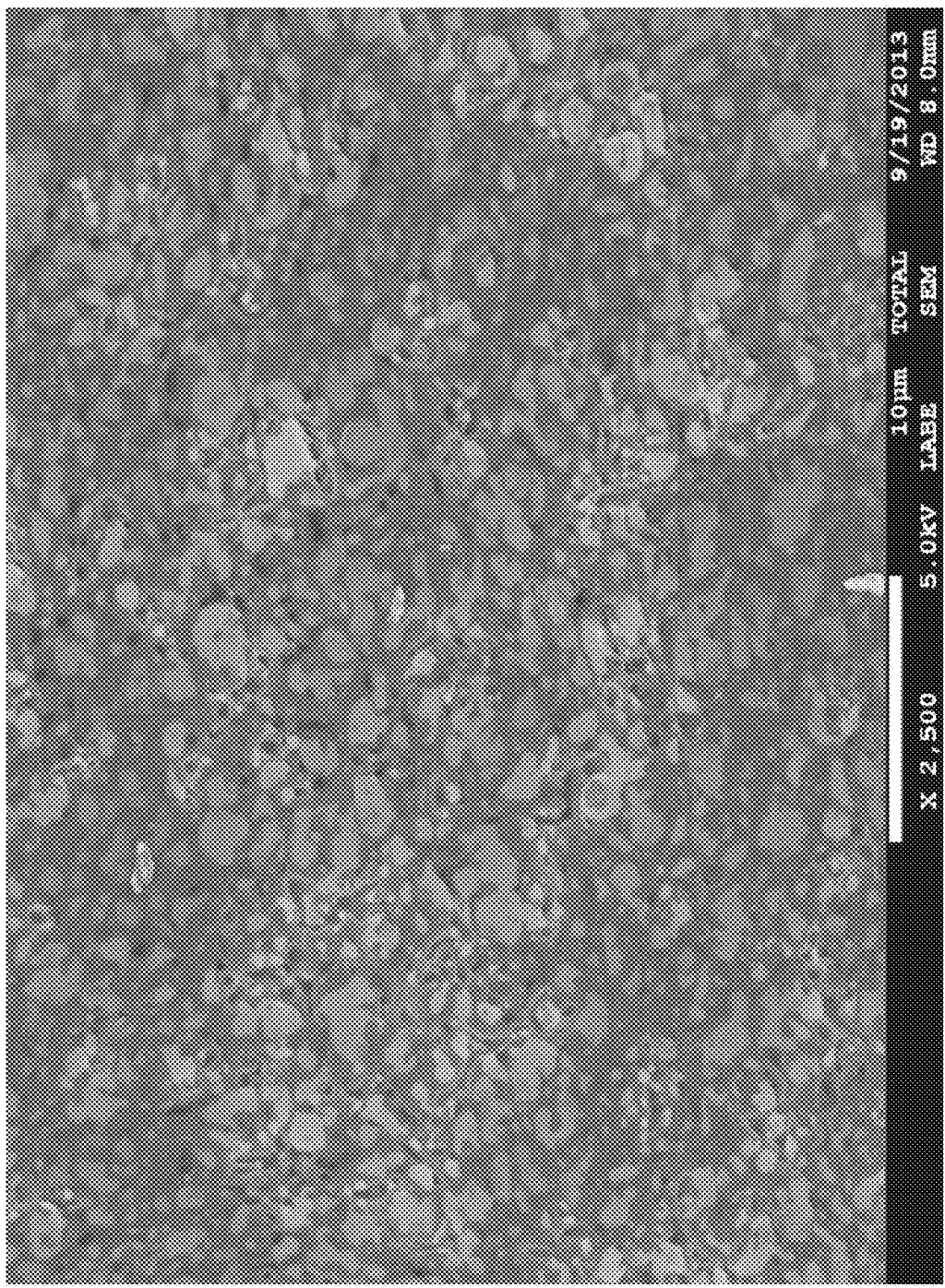
FIG. 3 shows a scanning electron microscopy (SEM) image of the composition A1 according to an embodiment of the invention.

FIG. 3 shows a scanning electron microscopy (SEM) image of the composition A1.

Figure 4:
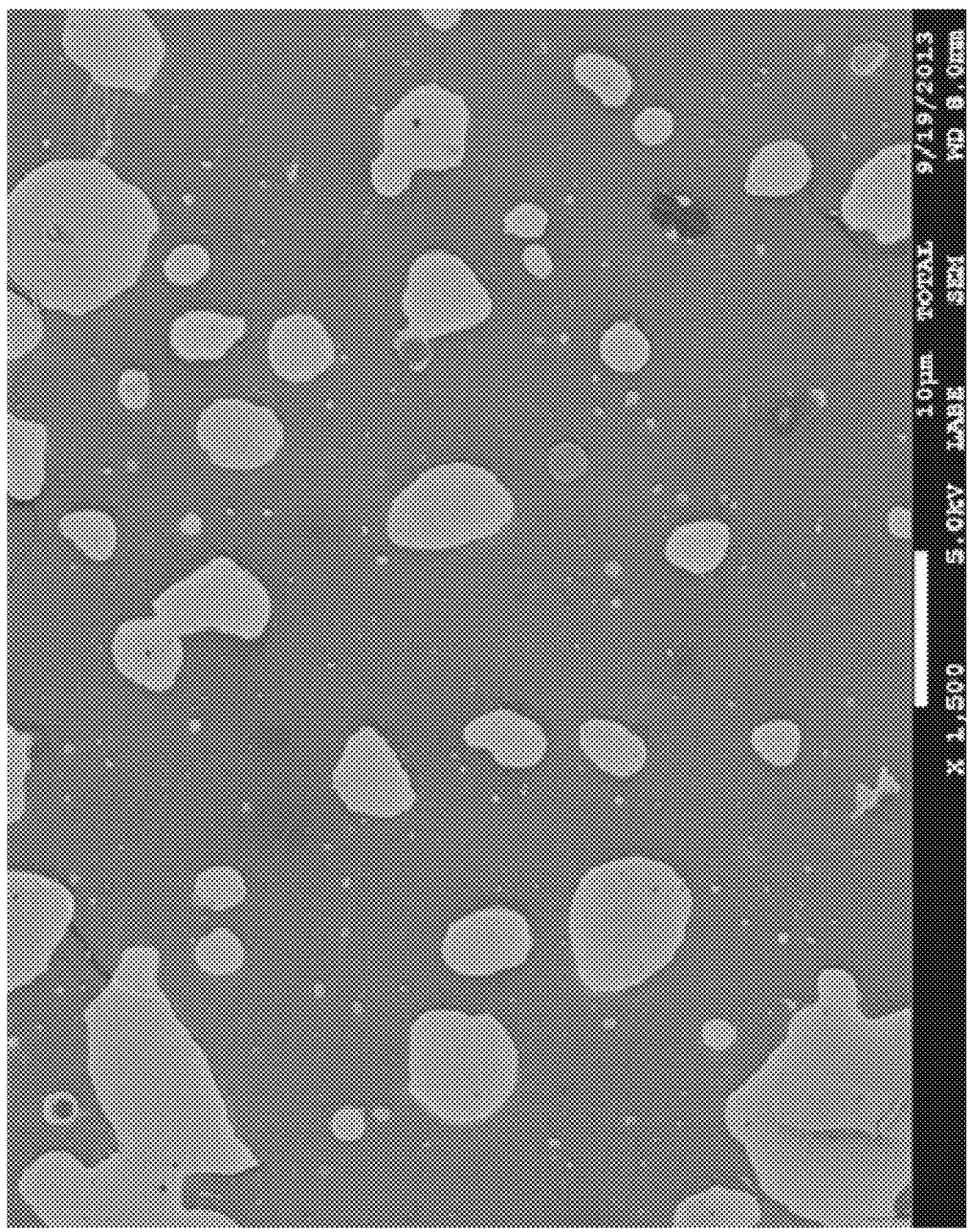
FIG. 4 shows a scanning electron microscopy (SEM) image of the composition A2.

FIG. 4 shows a scanning electron microscopy (SEM) image of the composition A2.

Figure 5:
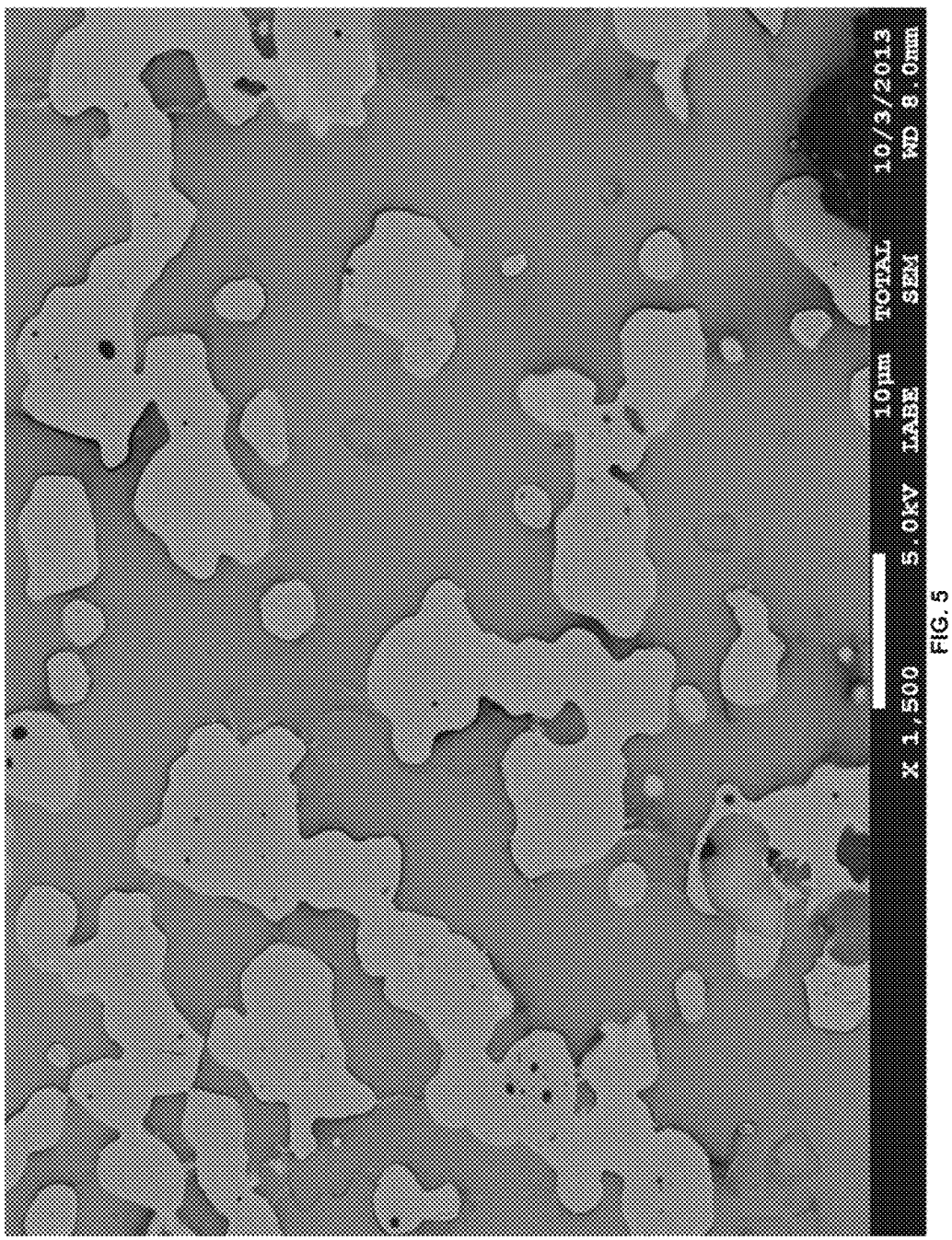
FIG. 5 shows a scanning electron microscopy (SEM) image of the composition A3.

FIG. 5 shows a scanning electron microscopy (SEM) image of the composition A3.

These results show that the presence of the PLA-PB-PLA copolymer in composition A1 drastically improves the compatibility of the PLA and PB materials.

FIG. 3, shows that in composition A1 according to the invention the polymers are dispersed evenly throughout the composition. When the PLA-PB-PLA copolymer was used in blend with PLA and PB (composition A1) at same level of total PB, the dispersion (SEM) was better than the PLA and PB blend without the copolymer as a co-continue two phases dispersion can be seen in FIG. 5.

The impact resistance also confirmed the better dispersion with the copolymer PLA-PB-PLA as at the same total level of PB, the presence of the copolymer in composition A1 allows to double the impact resistance.

The invention claimed is:

1. A composition comprising:
   a first polymer, wherein the first polymer is starch;
   a second polymer consisting of polybutadiene, wherein the polybutadiene has a weight average molecular weight of 280,000 to 360,000 g/mol; and
   a block copolymer of polylactic acid (PLA) and polybutadiene (PB), wherein the block copolymer is selected from the group consisting of PLA-PB-PLA triblock copolymer, PLA-PB multiblock copolymer, PLA-PB star copolymers, PLA-PB comb copolymers, PLA-PB gradient containing block copolymers; and mixtures thereof.

2. The composition according to claim 1, wherein the composition comprises from 5 to 95% by weight of the first polymer based on a total weight of the composition.

3. The composition according to claim 1, wherein the composition comprises from 5 to 95% by weight of the second polymer based on a total weight of the composition.

4. The composition according to claim 1, wherein the composition comprises from 1 to 90% by weight of the block copolymer based on a total weight of the composition.

5. The composition according to claim 1, wherein the composition comprises:
   from 30 to 48% by weight of the first polymer based on a total weight of the composition;
   from 30 to 48% by weight of the second polymer based on the total weight of the composition; and
   from 4 to 40% by weight of the block copolymer based on the total weight of the composition.

6. An article comprising the composition according to claim 1.

7. An article formed using a process comprising:
   contacting a first polymer with a second polymer and with a block copolymer of polylactic acid (PLA) and polybutadiene (PB);
   processing the composition using one or more polymer processing techniques selected from the group consisting of: film, sheet, pipe and fiber extrusion or coextrusion; blow molding; injection molding; rotary molding; foaming; and thermoforming;
   wherein the first polymer is selected from the group consisting of starch, polybutylene succinate, poly(butylene adipate-co-terephthalate), and mixtures thereof;
   wherein the second polymer is polybutadiene, wherein the polybutadiene has a weight average molecular weight of 280,000 to 360,000 g/mol.

8. A composition comprising:
   a first polymer selected from the group consisting of polylactic acid, starch, polybutylene succinate, poly(butylene adipate-co-terephthalate), and mixtures thereof;
   a second polymer consisting of polybutadiene, wherein the polybutadiene has a weight average molecular weight of 280,000 to 360,000 g/mol; and
   a block copolymer of polylactic acid (PLA) and hydroxyl functionalized polybutadiene (PB).

9. The composition according to claim 8, wherein the block copolymer is selected from the group consisting of PLA-PB diblock copolymer, PLA-PB-PLA triblock copolymer, PLA-PB multiblock copolymer, PLA-PB star copolymers, PLA-PB comb copolymers, PLA-PB gradient containing block copolymers; and mixtures thereof.

10. The composition according to claim 9, wherein the block copolymer is selected from the group consisting of PLA-PB-PLA triblock copolymer, PLA-PB multiblock copolymer, PLA-PB star copolymers, PLA-PB comb copolymers, PLA-PB gradient containing block copolymers; and mixtures thereof.

11. The composition according to claim 8, wherein the first polymer is polylactic acid.

12. The composition according to claim 11, wherein the poly-L-lactide or poly-D-lactide has an optical purity of at least 98% by weight.

13. The composition of claim 8, wherein the first polymer is starch, polybutylene succinate, poly(butylene adipate-co-terephthalate), or mixtures thereof.

14. The composition according to claim 8, wherein the polybutadiene has a polydispersity index of from 2.1 to 2.3.

15. The composition according to claim 8, wherein the polybutadiene has a cis content of at least 95% as measured by infrared spectroscopy.

16. The composition according to claim 8, wherein the polybutadiene is functionalized polybutadiene, wherein the functionalization is hydroxyl, epoxy, maleic anhydride, or silane.

17. The composition according to claim 8, wherein the PB has a vinyl content of at least 15%.

18. The composition of claim 17, wherein the PB incorporates a mono-olefin.

19. The composition of claim 8, wherein the block copolymer has at least 10% by weight of PB based on the total weight of the block copolymer.

20. The composition of claim 1, wherein the second polymer is polybutadiene, wherein the polybutadiene has a polydispersity index of from 2.1 to 2.3.

21. The composition of claim 1, wherein the polybutadiene has a cis content of at least 95% as measured by infrared spectroscopy.

* * * * *